US009613530B1

(12) United States Patent
Duale et al.

(10) Patent No.: US 9,613,530 B1
(45) Date of Patent: Apr. 4, 2017

(54) BUILDING SMART TRAFFIC CONTROL (71) Applicant: International Business Machines Corporation, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/870,123

(22) Filed: Sep. 30, 2015

(51) Int. Cl.
G08G 1/087 (2006.01)
G01C 21/34 (2006.01)
G08G 1/0962 (2006.01)
G01C 21/36 (2006.01)
G08G 1/01 (2006.01)

(52) U.S. Cl.
CPC ......... G08G 1/087 (2013.01); G01C 21/3492 (2013.01); G01C 21/3676 (2013.01); G08G 1/0112 (2013.01); G08G 1/0962 (2013.01)

(58) Field of Classification Search
CPC .... G08G 1/087; G08G 1/0962; G08G 1/0112; G01C 21/3492; G01C 21/3676
See application file for complete search history.

(56) References Cited

U.S. PATENT DOCUMENTS 6,700,504 B1 * 3/2004 Aslandogan ........... G08G 1/087
340/901
6,909,380 B2 * 6/2005 Brooke .................... G08G 1/20
340/906

(Continued)

FOREIGN PATENT DOCUMENTS

JP     2000-259986     *  9/2000
JP     2004-252854     *  9/2004
JP     2012-233856     *  11/2012

OTHER PUBLICATIONS

Wojtowicz et al., "Adaptive traffic control for emergency vehicles", IP.com No. 000183323, Publication Date: May 18, 2009, 5 pages.

(Continued)

Primary Examiner — Michael J Zanelli
(74) Attorney, Agent, or Firm — Michael A. Petrocelli (57) ABSTRACT

A computer-implemented method and system for vehicular traffic control and vehicle routing includes receiving a request for a best route, at a central system. The request including a current location and a destination from a requesting vehicle. Travel factors from the current location to the destination are determined. The travel factors include road availability, traffic conditions, and real time feedback, using the central system in response to receiving the request. The best route is determined for the requesting vehicle from the current location to the destination based on the travel factors, and real time feedback of the traffic conditions. The method and system includes initiating a plurality of traffic control actions along the route for the requesting vehicle. The traffic (Continued)

control actions are initiated along the route simultaneously and in concert with the requesting vehicle to clear the best route for the requesting vehicle to travel unobstructed to the destination.

18 Claims, 5 Drawing Sheets

(56) References Cited

U.S. PATENT DOCUMENTS

| | | | |
|---|---|---|---|
| 7,174,153 B2 | 2/2007 | Ehlers | |
| 7,864,071 B2 | 1/2011 | Bachelder et al. | |
| 8,344,909 B2 | 1/2013 | Teffer et al. | |
| 2004/0064245 A1* | 4/2004 | Knockeart | G01C 21/3415 701/414 |
| 2012/0326890 A1* | 12/2012 | Cross | G08G 1/082 340/906 |
| 2014/0118553 A1* | 5/2014 | Diba | G08G 1/087 348/149 |
| 2016/0057335 A1* | 2/2016 | Pisz | H04N 5/23206 348/149 |

OTHER PUBLICATIONS

IBM: List of IBM Patents or Patent Applications Treated as Related (Appendix P), Apr. 26, 2016, pp. 1-2.

U.S. Appl. No. 15/137,339, filed Apr. 25, 2016, entitled: "Building Smart Traffic Control", pp. 1-31.

* cited by examiner

BUILDING SMART TRAFFIC CONTROL

BACKGROUND

The present disclosure relates to a computer implemented method and system for vehicular traffic control and routing for a vehicle. In one example, maneuvering one or more emergency vehicles through traffic can have many challenges. For example, traffic conditions can be prohibitive for traveling, and in a city environment, gridlock can occur. Such problems can be more prevalent in a city environment. However, even less congested areas than in a city can have periods of high traffic (e.g., rush hour traffic, or an event that results in high traffic areas). In one example, traffic impediments for emergency vehicles can include, for example, slow response time to an emergency call. Emergency personnel being present on the scene of an emergency in the least time possible can reduce fatalities and the extent of injuries. Slow response times can be caused, for example, by slow moving traffic, traffic congestion, gridlock, and poor routing from a starting location to the scene of an emergency. Typical methods of clearing traffic for emergency vehicles (e.g., using a siren) are not as effective as is desirable, especially in heavy traffic (e.g., gridlock) or when more than one emergency vehicles intersect routes.

SUMMARY

According to an aspect of the present invention, a computer-implemented method for vehicular traffic control and vehicle routing includes receiving a request for a best route, at a central system. The request including a current location and a destination from a requesting vehicle. Travel factors from the current location to the destination are determined. The travel factors include road availability, traffic conditions, and real time feedback, using the central system in response to receiving the request. The best route is determined for the requesting vehicle from the current location to the destination based on the travel factors, and real time feedback of the traffic conditions. The method includes initiating a plurality of traffic control actions along the route for the requesting vehicle. The traffic control actions are initiated along the route simultaneously and in concert with the requesting vehicle to clear the best route for the requesting vehicle to travel unobstructed to the destination.

According to another embodiment of the present invention, a computer program product for vehicular traffic control and vehicle routing includes a computer readable storage medium having program instructions embodied therewith. The computer readable storage medium is not a transitory signal per se. The program instructions are executable by a computer to cause the computer to perform a method, including: receiving a request for a best route, at a central system, the request including a current location and a destination from a requesting vehicle; determining travel factors from the current location to the destination, the travel factors including road availability, traffic conditions, and real time feedback, using the central system in response to receiving the request; determining the best route for the requesting vehicle from the current location to the destination based on the travel factors, and real time feedback of the traffic conditions; and initiating a plurality of traffic control actions along the route for the requesting vehicle, the traffic control actions being initiated along the route simultaneously and in concert with the requesting vehicle to clear the best route for the requesting vehicle to travel unobstructed to the destination.

In another embodiment according to the present invention, a traffic control system for vehicular traffic control and vehicle routing includes a computer system comprising: one or more computer processors, one or more computer-readable storage media, and program instructions stored on one or more of the computer-readable storage media for execution by at least one of the one or more processors. The program instructions including: receiving a request for a best route, at a central system, the request including a current location and a destination from a requesting vehicle; determining travel factors from the current location to the destination, the travel factors including road availability, traffic conditions, and real time feedback, using the central system in response to receiving the request; determining the best route for the requesting vehicle from the current location to the destination based on the travel factors, and real time feedback of the traffic conditions; and initiating a plurality of traffic control actions along the route for the requesting vehicle, the traffic control actions being initiated along the route simultaneously and in concert with the requesting vehicle to clear the best route for the requesting vehicle to travel unobstructed to the destination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
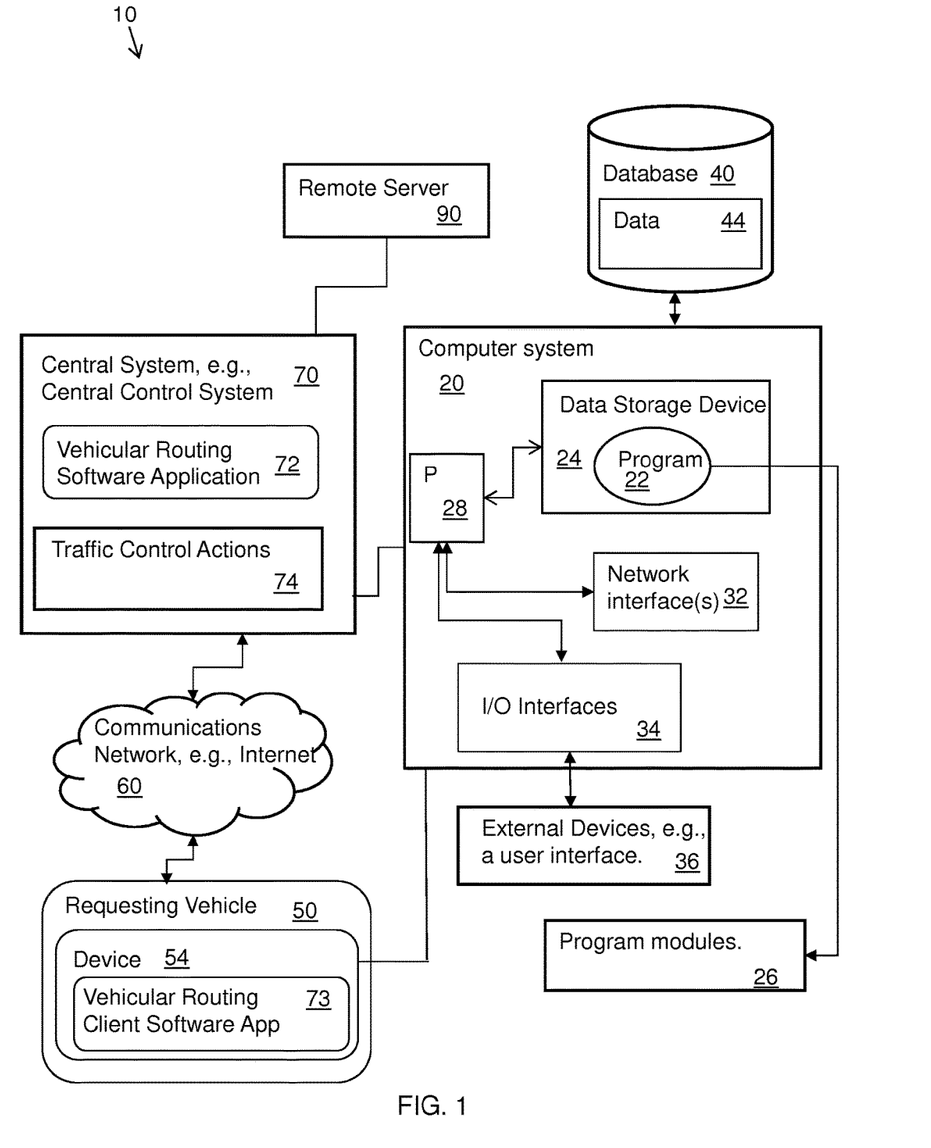
FIG. 1 is a schematic block diagram illustrating an overview of a system and methodology for vehicular traffic control and vehicle routing according to an embodiment of the disclosure.
Figure 2:
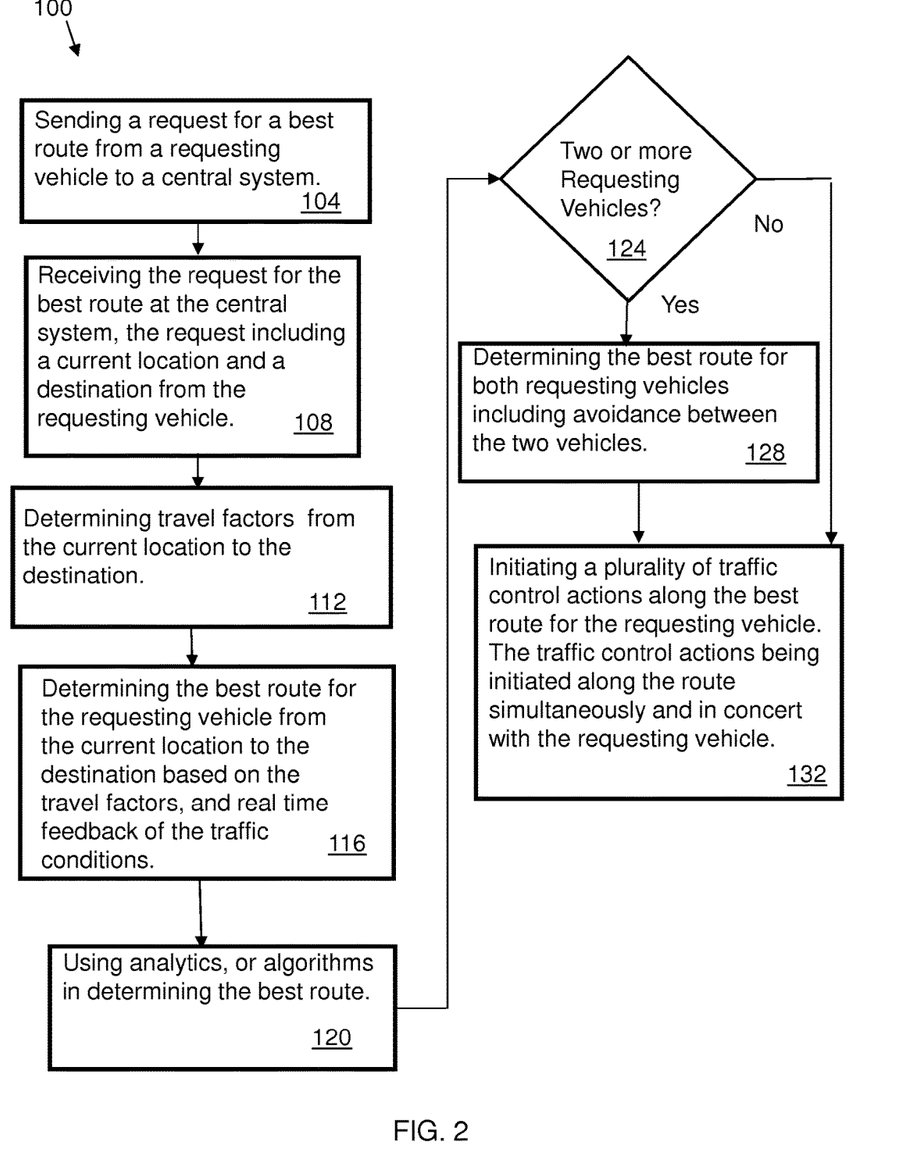
FIG. 2 is a flow chart illustrating a method for vehicular traffic control and vehicle routing using the system shown in FIG. 1, according to an embodiment of the disclosure.
Figure 3:
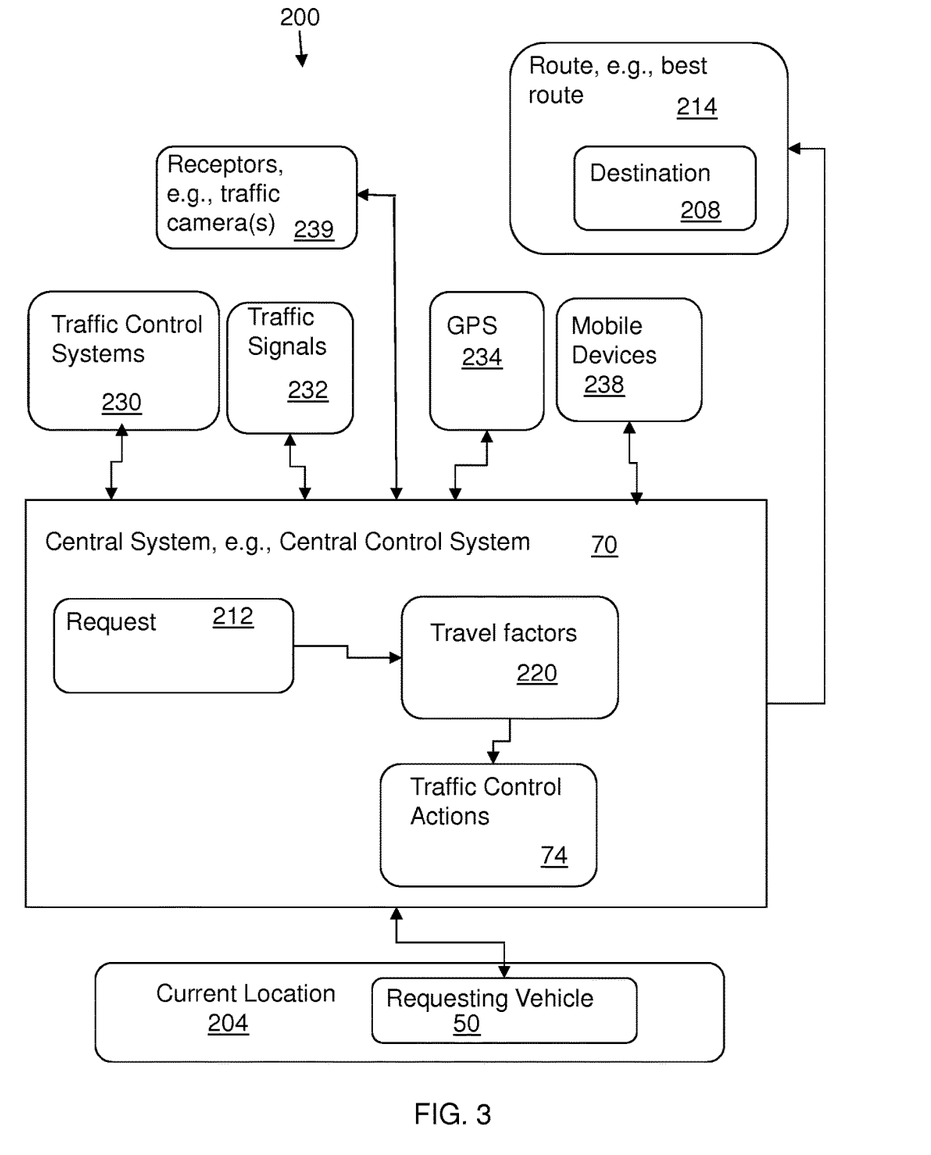
FIG. 3 is a functional block diagram depicting the functionally of a system for vehicular traffic control and vehicle routing according to the method and system shown in FIGS. 1 and 2, according to an embodiment of the disclosure.

Referring to FIGS. 1, 2 and 3 a system 10 and method 100 according to an embodiment of the present disclosure for a computer implemented method and system for vehicular traffic control and vehicle routing. One or more embodiments of the system and the method of the present disclosure are depicted according to a functional system 200, shown in FIG. 3.

In one embodiment of the present disclosure, the method 100 includes receiving a request 212 for a best route 214, at a central system 70 (at block 108) from a requesting vehicle 50 which sent the request (at block 104). The request 212 and the best route 214 are depicted in the functional system 200 shown in FIG. 3. The request includes a current location 204 and a destination 208 for the requesting vehicle. In one example, the requesting vehicle can be referred to as a priority vehicle, which can refer to any vehicle (and occupant(s)) that require prioritization on the roadway. For example, an emergency vehicle (e.g., fire truck, police car, ambulance), a high ranking official that may need an escort, or any other situation where a person and vehicle needs to be prioritized for many reasons, for example, security, traffic considerations, health emergency, emergency event, or an event regarding a declared state of emergency. The requesting vehicle 50 can include a device 54 displaying or mapping the current location and destinations within a map of the vicinity.

The central system 70 can also be referred to as a central command system (CCS) (or center). The central system can be embodied as a command center for an area, including a city, town, or municipality. The central system can also be a remote system that services locations anywhere in a country or the world. The method and system of the present embodiments can be embodied as a software program which stands alone and interacts with a Global Positioning System (GPS), or is an add-on or integral with an existing GPS system. The method of the present disclosure can also be embodied as a software program, for example, a vehicular routing software application 72. The software program can also be accessed remotely, for example at a remote server 90, or as a service. A client version 73 of the vehicular routing software application can be run on the device 54 in the requesting vehicle 50.

The request 212 from the requesting vehicle 50 can be sent and received using wireless technology via a communications system embodied as communications network 60, which can include, for example, the Internet, a telephone system, or a wide area network. Wireless receivers and transmitters are included in the requesting vehicle and at the central system for communications therebetween.

The method 100 includes determining travel factors 220 from the current location 204 to the destination 208, as in block 112. The travel factors can include for example, road availability, traffic conditions, and real time feedback. Using the central system in response to receiving the request, the central system can determine the travel factors. For example, such factors can be accessed using the Internet, city traffic control, or GPS systems, weather services, traffic services.

The central system can determine the best route for the requesting vehicle from the current location to the destination based on the travel factors, as in block 116. The determination can include real time feedback of the traffic conditions. The real time feedback can be, for example, using mounted cameras from the requesting vehicle itself, other vehicles in the vicinity of the requesting vehicle (for example, other emergency vehicles), or from traffic cameras 239 or the like. The determination of the best route can be made using an algorithm or a routing algorithm, and using analytics, as in block 120.

For example, the streets and avenues of the city can be represented as a network graph with nodes representing intersections and streets/avenues labeled at the edges of the graph. Each edge label can be associated with a cost that can be related to current traffic flow for example. If an emergency vehicle is travelling in a certain path, edge labels corresponding to the paths may be considered a higher cost. The cost can be considered when determining a best route. This data can be used in an analytical calculation for the next emergency vehicle's best route. In one instance, after an emergency vehicle passes a certain segment of its path (for example, when it crosses an interaction), the cost of the completed segment is reset by removing any cost that was added as a result of the priority vehicle (e.g., emergency vehicle) passing the segment.

Other factors can be used when determining a best route, such as, the likelihood of being able to clear an intersection or path, at a certain time of day, or due to weather conditions, or an event, which could include a traffic accident or road condition. The availability of traffic signs to detour traffic, type of road (e.g., highway or local road), road conditions, other events in the vicinity, as well as other priority vehicles in the vicinity, can also be factors in determining a best route.

In one example, two or more requesting vehicles in the same vicinity (e.g., emergency vehicles in the same vicinity) can request best routes to respective destinations (block 124). The same vicinity would include the two requesting vehicles crossing into each other's path when traversing from their present location to their respective destinations. The central system can determine the best route for both requesting vehicles including avoidance between the two vehicles, as in block 128. The method proceeds to block 132 from block 128. If there are not two or more requesting vehicles in the same vicinity, the method proceeds to block 132.

The method 100 includes initiating a plurality of traffic control actions 74 along the best route for the requesting vehicle. The best route can include one or more evasive actions. The evasive actions can include avoiding a traffic issue to provide the best route to the destination. The traffic control actions are initiated along the route simultaneously and in concert with the requesting vehicle to clear the best route for the requesting vehicle to travel unobstructed to the destination, as in block 132.

The traffic control actions 74 can include, for example, requesting a traffic signal 232 to change or remain red or green. The traffic control action can include initiating one or more traffic control signs to initiate the traffic control actions for requiring vehicles along the route to move in a prescribed direction. The traffic control systems or signs 230 can be in addition to traffic signals and typical traffic signs and mounted adjacent to a traffic signal or on a signal post or along a road side. The traffic control sign is responsive to the central system. Thus, the traffic control sign may not be part of a town's or city's typical traffic control system. The traffic control sign can be part of an exclusive system with the central system to provide traffic control as described herein. In another example, one or more traffic control signs can have a duel use for typical or normal traffic conditions, and additionally be used by the central system. The central system can access and control the traffic control sign on demand and be able to override the traffic control sign(s), to provide traffic control for a requesting vehicle (e.g., an emergency vehicle). The central system can directly control the traffic control sign(s) so that traffic patterns can be manipulated at will, in a prescribed manner and timed to adjust traffic flow to accommodate the requesting vehicle(s). The traffic control signs can include signals for the vehicles to exit a road, or for the vehicles to stop, or for the vehicles to take an alternate route, or for the vehicles to slow down.

One example of the method and system of the present disclosure may include timing when a requesting vehicles will arrive at an intersection or area, and timing the vehicles control for the requesting vehicle's arrival. In another example, a request for a best route requiring traffic control may include initiating traffic control by the central system while determining when a requesting vehicle will approach a vicinity for the best possible result when the requesting vehicle approaches a heavily traveled area.

In another example, the central system can receive multiple requests for respective routes. Each of the requests includes the current location and the destination from respective multiple requesting vehicles. The central system will determine the route for each of the requesting vehicles based on the travel factors, and initiate the plurality of traffic control actions along each of the routes for the respective requesting vehicles.

Figure 4:
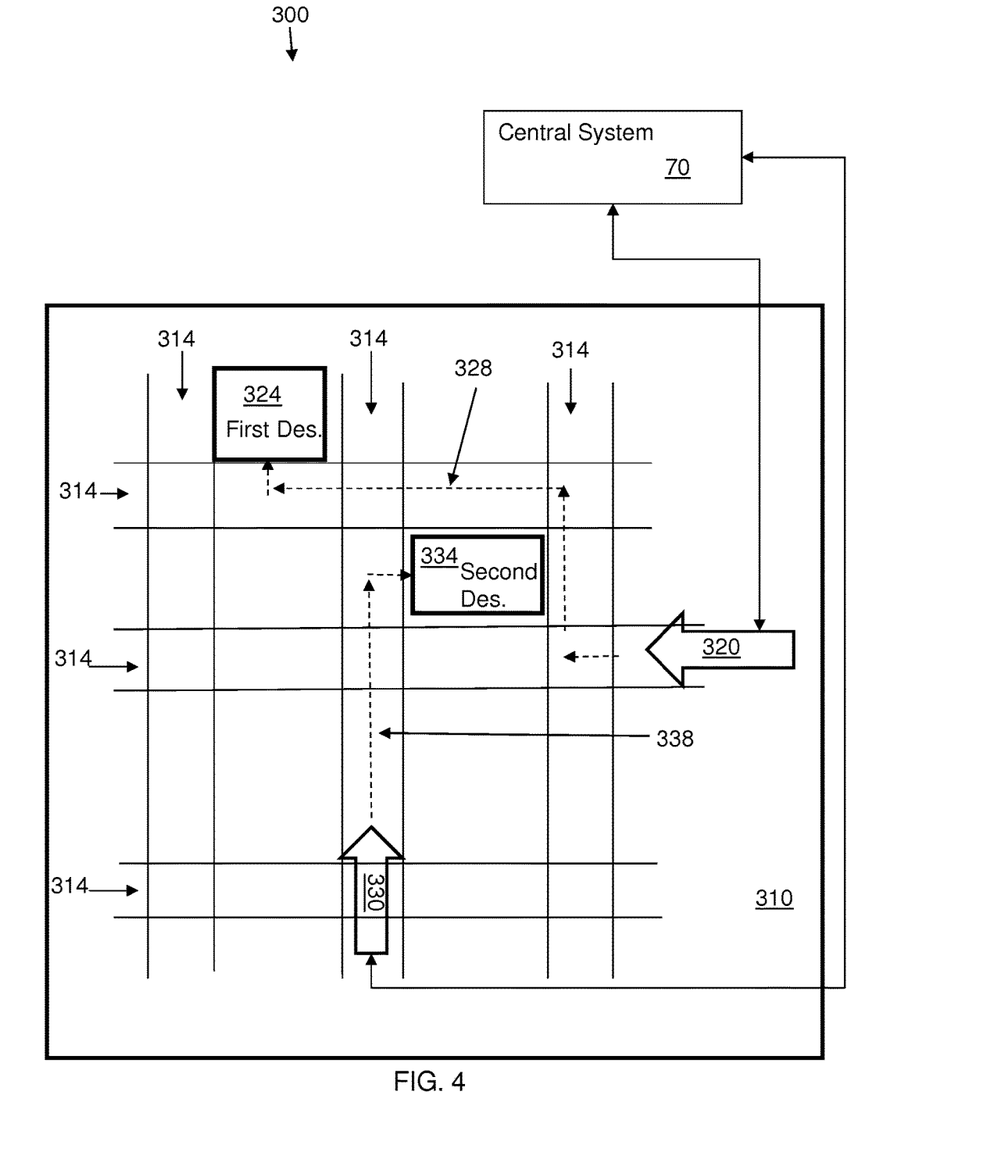
FIG. 4 is a block diagram depicting vehicles and vehicle routing according to one embodiment of the present disclosure.

Referring to FIG. 4, an avoidance situation 300 is shown when two requesting vehicles, a first vehicle 320 and a second vehicle 330, which have requested separate destinations but can have overlapping routes. In this example the first and second vehicles are emergency vehicles on their way to a first destination 324 and a second destination 334, respectively. The vehicles are operating in the same vicinity 310 and travelling on roads 314. Each of the vehicles 320, 330 has requested a best route from the central system 70, according to the embodiments described herein. The central system can send each of the vehicles a route, a first route 328 for the first vehicle 320, and a second route 338 for the second vehicle 330.

Figure 5:
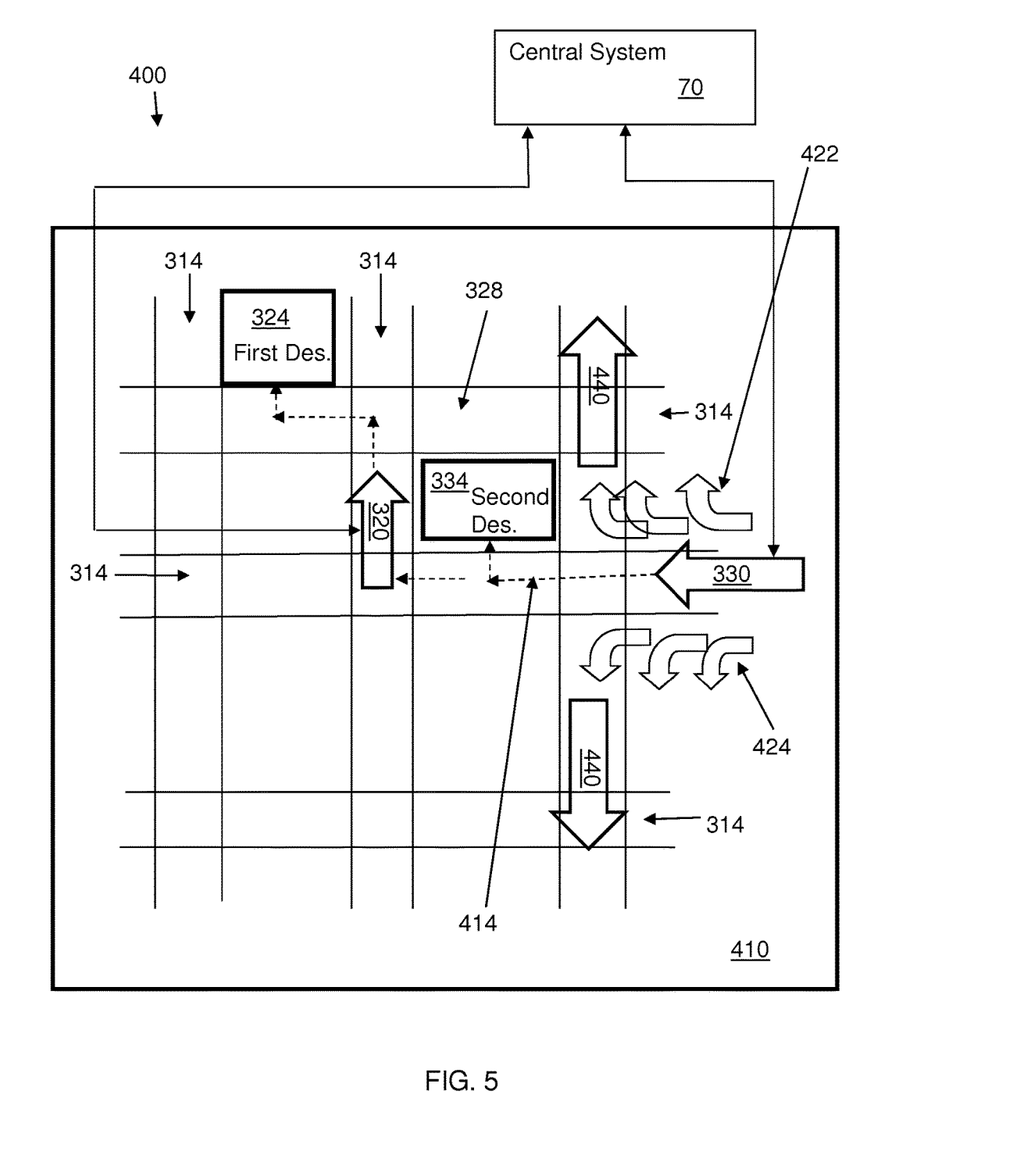
FIG. 5 is a block diagram depicting vehicles and vehicle routing according to another embodiment of the present disclosure.

Referring to FIG. 5, wherein similar features have the same reference numerals as in FIG. 3, a traffic control situation 400 is shown when two requesting vehicles, a first vehicle 320 and a second vehicle 330, have requested separate destinations, a first destination 324 and a second destination 334, respectively. In this situation, the vehicles are in the same vicinity 410 and the vehicles can take the same route 414 on roads 314. However, the first and the second vehicles are spatially apart and do not interfere or intersect with each other. Traffic control actions are taken to clear the route of traffic as indicated by first arrows 422 and second arrows 424. In this example the first and second vehicles are emergency vehicles on their way to the first destination 324 and the second destination 334, respectively. Each of the vehicles 320, 330 has requested a best route from the central system 70, according to the embodiments described herein. The central system can send each of the vehicles the route 414, and initiate the traffic control actions 422, 424 to move vehicles 440 from the route 414.

The embodiments of the present disclosure provide a smart traffic control system. The system and associated method can include a Central Command System (CCS) (also referred to as a central system herein) that can implement a solution for maneuvering vehicles (e.g., emergency vehicles) wherein the vehicles flow seamlessly or unobstructed to their destination. The central Command System can use, for example, traffic flow analysis or theory, GPS 234 for traffic feedback, and feedback from the emergency vehicles and law enforcement personnel.

In one embodiment, a smart traffic control system can include receiving information from emergency personnel at a central command system or unit. The information can include the emergency personnel's physical location and their desired destination. The central command finds the optimum route (which is one example can be the least difficult route) from their current location to the destination. The central command system can broadcast the location and direction of emergency vehicles. The central command system can reduce and/or block incoming traffic to the nearest intersections (e.g., streets that cross those the emergency vehicles are on/traveling). This enables the traffic to move forward and give emergency vehicles enough room to go through. The central command system can also force vehicles ahead and on same route of the emergency vehicles to exit the street that emergency vehicles are travelling.

In another embodiment, the embodiments of the present disclosure can apply to general traffic flow, as well as one or more designated vehicles. For example, the embodiments of the present disclosure can reduce traffic congestion in particular areas creating a more even traffic flow.

The embodiments of the present disclosure include a central system (e.g., a central command system (CCS)) that uses network theories, GPS, and sensors. A feedback system to the central command system supplies feedback (such as traffic patterns) to other priority vehicles in the area, or to a requesting vehicle, to direct the vehicles to their destination. The feedback system can include a network including receptors 239, signals, a traffic control system, mobile devices 238, GPS 234, and human feedback. Thus, the CCS can receive requests/information from emergency vehicles. Based on the obtained information, the CCS analyses end-to-end route of the emergency vehicle (from the start to the desired destination) to find the best route to the destination, which can include the least amount of time and least traffic. In addition, the CCS can monitor the movement and location of the emergency vehicle at any given moment by using GPS and sensors mounted on the vehicles. The CCS can also account for and take evasive action if more than one emergency vehicle is approaching a given intersection at the same time.

In one embodiment of the present disclosure, the CCS informs the operator of a requesting vehicle (e.g., emergency vehicle, priority vehicle) of the best route. In addition to the best route, the delivered information includes the positions and directions of other potential emergency vehicles in the vicinity.

In another embodiment, the CCS can send signals to the traffic light control system of all interaction in the route of emergency vehicle such that the traffic flow into the route of the emergency vehicle is reduced. For example, making the light green for the requesting vehicle, and red for all other directions. In another example, the affected traffic light control system is requested to keep the green light longer for the path heading to the emergency vehicles' direction and slowing down any traffic flow into the immediate intersections to be crossed by the emergency vehicles. In another embodiment, traffic control infrastructure may also include traffic control signs (in addition to traffic signals) that can signal and direct traffic away from the direction of the in-coming emergency vehicles. In one example, such traffic control signs can be posted on light poles along a side the street. The traffic control signs can proactively ease traffic ahead of the emergency vehicles. For example, assume an emergency vehicle is travelling north on First Avenue on a heavily traveled road (e.g., a city environment) and the vehicle is approaching a road running east to west (perpendicular crossing the road running north). The traffic control signs can signal all traffic on First Avenue to make right or left turns, respectively, as soon as possible. In one example, if there are designated turning lanes, those lanes can be marked as right/left turn only via the proposed signs. In one example, violations of the signs can be captured with traffic cameras for enforcement.

In addition, for example, the CCS can send a broadcast to law enforcement and traffic officers within a certain range of the emergency vehicle. The officers and emergency vehicle drivers can, in turn, send live feedback to the CCS. The live feedback can be gathered from body cameras or vehicle mounted cameras, and can be used for route recalculation.

The CCS may also send a broadcast via a GPS system to drivers and pedestrians as emergency vehicles are approaching them. The drivers may have communications system in their vehicles for receiving the broadcast, such as a computer and display or a GPS device. The drivers can react properly (e.g., avoid priority vehicle) with respect to the approaching vehicle as they approach each other. The CCS can send the broadcast after filtering out all subscribers that are not in the vicinity of the emergency vehicles. For example, only subscribers for receiving such a broadcast and in the vicinity will receive the broadcast.

The CCS may also send signals to certain interaction traffic control systems, law enforcement officials, other emergency drivers, other drivers, and communicate to pedestrians (for example, on mobile devices via text messaging) informing them that an emergency vehicle is in their vicinity.

The embodiment of the present disclosure improve efficiency for priority vehicles (e.g., requesting vehicles or emergency vehicles) to proceed through traffic conditions. For example, such improved efficiency is known to improve chances of saving lives when an emergency vehicle is responding to a call for help. The embodiments of the present disclosure provide (end to end) full route management of traffic so that the priority vehicle can proceed from its current location to its destination by the most efficient route based on distance, traffic conditions, and other priority vehicles that can be in the vicinity.

The central system 70 includes a computer system, as shown in FIG. 1. The device 54 of the requesting vehicle can also include a computer system. The computer system 20 is envisioned as a generic computer system and exemplary for devices and computer systems of the present disclosure. The device 54 can be a mobile device including a GPS device. The central system 70 can be a computer system or device which is part of a service which accesses a communications network (e.g., the Internet). A vehicle routing software application 72 embodying the method of the present disclosure can be stored as a program 22 on a data storage device 24 and run by a processor 28 and can be a separate application as shown in FIG. 1, and alternatively can be part (or integral with) another application, e.g., a GPS system. The method 100 can be implemented using the vehicle routing software application 72 shown in FIG. 1. The method can also be provided as a service which can be remote, for instance, including an application residing on a remote server exemplified by remote server 90, which can be accessible using the Internet or a network. A requesting vehicle 50 can also include a computer system of a device 54 exemplified as the computer system 20. The device 54 can include a client version of the vehicle routing software application 73.

More specifically referring to the computer system 20 shown in FIG. 1, in one embodiment according to the present disclosure, the method 100 may be embodied in a program 22 embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 60.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for vehicular traffic control and vehicle routing, the computer program product comprising a non-transitory computer readable storage medium having program instructions embodied therewith, the program instructions executable by a computer to cause the computer to perform a method, comprising:
   receiving a request for a best route, at a central system, the request including a current location and a destination from a requesting vehicle;
   determining travel factors from the current location to the destination, the travel factors including road availability, traffic conditions, and real time feedback of traffic conditions, using the central system in response to receiving the request;
   determining the best route for the requesting vehicle from the current location to the destination based on the travel factors and the real time feedback of the traffic conditions, wherein the real time feedback includes using live feedback from a mounted camera on the requesting vehicle;

sending the best route from the central system to the requesting vehicle; and initiating a plurality of traffic control actions along the route for the requesting vehicle, the traffic control actions being initiated along the route simultaneously and in concert with the requesting vehicle to clear the best route for the requesting vehicle to travel unobstructed to the destination.

2. The computer program product of claim 1, further comprising:

initiating one or more traffic control signs in addition to a traffic signal to initiate the traffic control actions for requiring vehicles along the route to move in a prescribed direction, or to slow down, or to stop, and the traffic control signs being responsive to the central system.

3. The computer program product of claim 1, further comprising:

initiating one or more traffic control signs in addition to a traffic signal to initiate the traffic control actions for signaling vehicles to exit a road, or for the vehicles to take an alternate route, and the traffic control signs being responsive to the central system.

4. The computer program product of claim 1, further comprising:

receiving multiple requests for respective routes, each of the requests including the current location and the destination from respective multiple requesting vehicles;

determining the route for each of the requesting vehicles based on the travel factors; and initiating the plurality of traffic control actions along each of the routes for the respective requesting vehicles.

5. The computer program product of claim 1, wherein the best route includes an evasive action, the evasive action including avoiding a traffic issue to provide the route to the destination.

6. The computer program product of claim 5, wherein the evasive action is in response to multiple requesting vehicles approaching each other.

7. The computer program product of claim 1, wherein the requesting vehicle is part of a group of vehicles.

8. The computer program product of claim 1, wherein the requesting vehicle is an emergency vehicle, and the command center alerts other emergency vehicles.

9. The computer program product of claim 1, wherein the traffic control action includes one or more of: determining a traffic signal, and requiring vehicles to exit a road.

10. A traffic control system for vehicular traffic control and vehicle routing, the system comprising:

a computer system comprising: one or more computer processors, one or more computer-readable storage media, and program instructions stored on one or more of the computer-readable storage media for execution by at least one of the one or more processors, the program instructions, comprising:

receiving a request for a best route, at a central system, the request including a current location and a destination from a requesting vehicle;

determining travel factors from the current location to the destination, the travel factors including road availability, traffic conditions, and real time feedback of traffic conditions, using the central system in response to receiving the request;

determining the best route for the requesting vehicle from the current location to the destination based on the travel factors and the real time feedback of the traffic conditions, wherein the real time feedback includes using live feedback from a mounted camera on the requesting vehicle;

sending the best route from the central system to the requesting vehicle; and initiating a plurality of traffic control actions along the route for the requesting vehicle, the traffic control actions being initiated along the route simultaneously and in concert with the requesting vehicle to clear the best route for the requesting vehicle to travel unobstructed to the destination.

11. The system of claim 10, further comprising:

initiating one or more traffic control signs in addition to a traffic signal or a traffic to initiate the traffic control actions for requiring vehicles along the route to move in a prescribed direction, or to slow down, or to stop, and the traffic control signs being responsive to the central system.

12. The system of claim 10, further comprising:

initiating one or more traffic control signs in addition to a traffic signal to initiate the traffic control actions for signaling vehicles to exit a road, or for the vehicles to take an alternate route, and the traffic control signs being responsive to the central system.

13. The system of claim 10, further comprising:

receiving multiple requests for respective routes, each of the requests including the current location and the destination from respective multiple requesting vehicles;

determining the route for each of the requesting vehicles based on the travel factors; and initiating the plurality of traffic control actions along each of the routes for the respective requesting vehicles.

14. The system of claim 10, wherein the best route includes an evasive action, the evasive action including avoiding a traffic issue to provide the route to the destination.

15. The system of claim 14, wherein the evasive action is in response to multiple requesting vehicles approaching each other.

16. The system of claim 10, wherein the requesting vehicle is part of a group of vehicles.

17. The system of claim 10, wherein the requesting vehicle is an emergency vehicle, and the command center alerts other emergency vehicles.

18. The system of claim 10, wherein the traffic control action includes one or more of: determining a traffic signal, and requiring vehicles to exit a road.

\* \* \* \* \*